United States Patent
Hong et al.

(10) Patent No.: US 8,265,385 B2
(45) Date of Patent: Sep. 11, 2012

(54) IMAGE PROCESSING APPARATUS AND METHOD OF ENHANCING DEPTH PERCEPTION

(75) Inventors: Ji Young Hong, Seongnam-si (KR); Ho Young Lee, Suwon-si (KR); Du Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 822 days.

(21) Appl. No.: 12/382,186

(22) Filed: Mar. 10, 2009

(65) Prior Publication Data

US 2010/0119149 A1     May 13, 2010

(30) Foreign Application Priority Data

Nov. 12, 2008   (KR) .................. 10-2008-0112269

(51) Int. Cl.
*G06K 9/00* (2006.01)
(52) U.S. Cl. ...................................................... 382/167

(58) Field of Classification Search .......... 382/162–167; 348/453–459; 358/518–523, 538; 345/589–605
See application file for complete search history.

(56) References Cited

U.S. PATENT DOCUMENTS

| | | | |
|---|---|---|---|
| 2007/0262985 A1 | 11/2007 | Watanabe et al. | |
| 2008/0002910 A1 | 1/2008 | Ojima et al. | |

FOREIGN PATENT DOCUMENTS

| | | |
|---|---|---|
| JP | 2004-159148 | 6/2004 |
| JP | 2007-329902 | 12/2007 |
| JP | 2008-33897 | 2/2008 |

*Primary Examiner* — Atiba O Fitzpatrick
(74) *Attorney, Agent, or Firm* — Staas & Halsey LLP

(57) ABSTRACT

Disclosed is an image processing apparatus and method for enhancing a depth perception. The image processing apparatus and method for enhancing the depth perception may classify an input image including a plurality of layers according to a depth into a foreground layer, a middle layer, and a background layer, and process a color component of each of the layers. The image processing apparatus and method for enhancing the depth perception may enhance the depth perception by stages according to the depth, thereby generating an image expressing natural realism.

17 Claims, 7 Drawing Sheets

FIG. 6

<PROCESS FOR LIGHTNESS 601>

| METHOD | FOREGROUND LAYER | MIDDLE LAYRE | STRONG LIGHTNESS | MEDIUM LIGHTNESS | WEAK LIGHTNESS |
|---|---|---|---|---|---|
| A | RED OR YELLOW | GREEN | DECREASE | CHANGE X | INCREASE |
| B | RED OR YELLOW | BLUE | CHANGE X | DECREASE | CHANGE X |
| C | GREEN | RED/YELLOW | INCREASE | DECREASE | CHANGE X |
| D | GREEN | GREEN | CHANGE X | CHANGE X | DECREASE |
| E | BLUE | RED/YELLOW | INCREASE | INCREASE | DECREASE |
| F | BLUE | GREEN | INCREASE | INCREASE | INCREASE |

LIGHTNESS INTENSITY OF BACKGROUND LAYER

<PROCESS FOR CHROMA 602>

| METHOD | FOREGROUND LAYER | MIDDLE LAYRE | STRONG LIGHTNESS | MEDIUM LIGHTNESS | WEAK LIGHTNESS |
|---|---|---|---|---|---|
| A | RED OR YELLOW | GREEN | DECREASE | CHANGE X | INCREASE |
| B | RED OR YELLOW | BLUE | CHANGE X | CHANGE X | CHANGE X |
| C | GREEN | RED/YELLOW | CHANGE X | INCREASE | INCREASE |
| D | GREEN | BLUE | CHANGE X | INCREASE | CHANGE X |
| E | BLUE | RED/YELLOW | CHANGE X | CHANGE X | DECREASE |
| F | BLUE | GREEN | CHANGE X | DECREASE | INCREASE |

LIGHTNESS INTENSITY OF BACKGROUND LAYER

IMAGE PROCESSING APPARATUS AND METHOD OF ENHANCING DEPTH PERCEPTION

CROSS-REFERENCE TO RELATED APPLICATIONS

This application claims the benefit of Korean Patent Application No. 10-2008-0112269, filed on Nov. 12, 2008, in the Korean Intellectual Property Office, the disclosure of which is incorporated herein by reference.

BACKGROUND

1. Field

Example embodiments of the present disclosure relate to an image processing apparatus and method of enhancing depth perception, and more particularly, to an image processing apparatus and method of enhancing perception with respect to depth of an input image by controlling a colour component of each layer with respect to an input image including layers in different depths.

2. Description of the Related Art

Demand has been increasing for an ultra definition (UD) image service due to the introduction of digital movies. Specifically, enhanced realism is needed to be expressed on a large screen. In particular, to express a realistic image on a large screen such as a UD image, an image processing procedure is more important than anything else.

Also, a 3-dimensional (3D) image that is viewed without 3D spectacles often fails to achieve realism, causes visual fatigue, and can provide an unnatural image to an audience.

To generate a realistic image, 3D-effect image enhancements may be needed. Since a conventional method for enhancing 3D-image effects is typified by an image processing method that fails to consider an input image characteristic, the conventional method is insufficient for expressing natural realism.

Accordingly, a method for generating an image expressing natural realism may be needed.

SUMMARY

According to example embodiments, an image processing apparatus may be provided. The image processing apparatus includes a color space converting unit to convert a color space of an input image including layers according to a depth, a foreground layer processing unit to process a colour component of a foreground layer of the input image, a background layer processing unit to process a colour component of a background layer of the input image, a middle layer processing unit to process a colour component of a middle layer of the input image using the processed colour component of the foreground layer and the processed colour component of the background layer.

In this instance, the foreground layer processing unit may increase at least one colour component of a contrast, a chroma, and a lightness of the foreground layer, and also may increase a depth perception using another image processing method.

Also, the background layer processing unit may decrease at least one colour component of a contrast, a chroma, and a lightness of the background layer, and also may increase a depth perception using another image processing method.

Also, the middle layer processing unit may include a hue range determining unit to determine a hue range where a representative hue of the foreground layer and a representative hue of a middle layer belong, and a middle layer controlling unit to control a color stereopsis of the middle layer according to a lightness intensity of the background layer.

According to example embodiments, there may be provided an image processing method, the method including converting a color space of an input image including layers according to depth, processing a colour component of a foreground layer of the input image, processing a colour component of a background layer of the input image, and processing a colour component of a middle layer of the input image using the processed colour component of the foreground layer and the processed colour component of the background layer.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which:

FIG. 6 illustrates an example of processing a lightness and a chromatic of a middle layer based on a intensity of a lightness of a background layer according to example embodiments.

DETAILED DESCRIPTION

Figure 1:
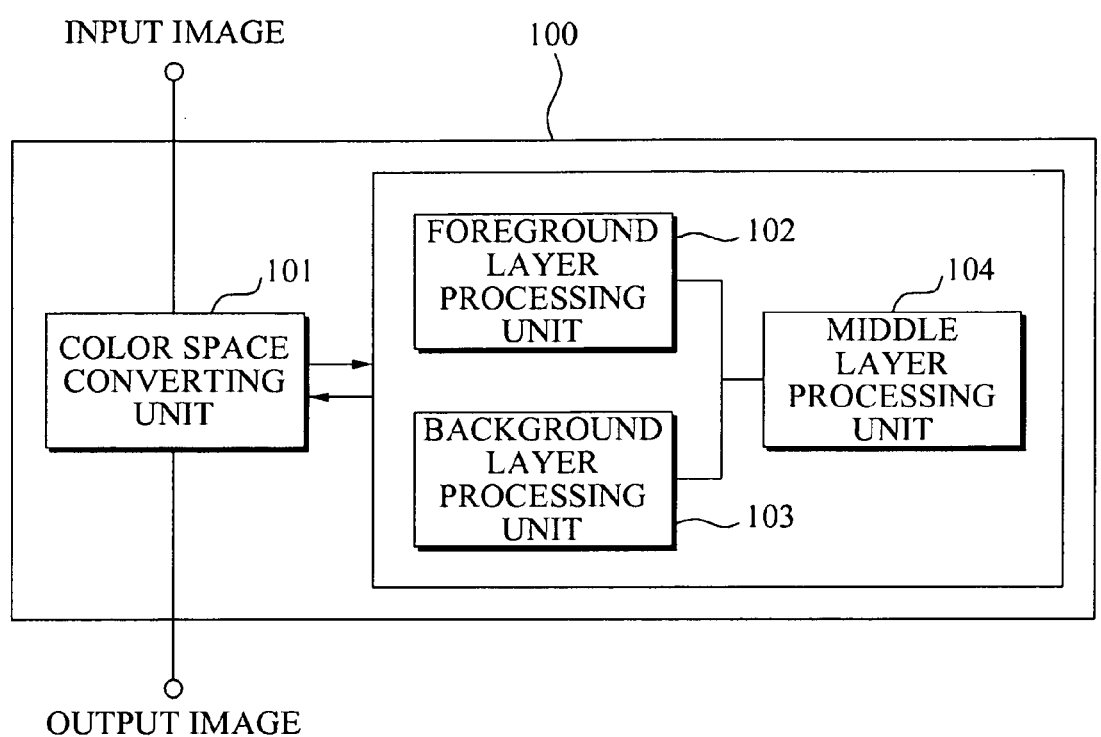
FIG. 1 is a block diagram illustrating an entire configuration of an image processing apparatus according to example embodiments.

Reference will now be made in detail to example embodiments, which are illustrated in the accompanying drawings, wherein like reference numerals refer to the like elements throughout. Example embodiments are described below to explain the present disclosure by referring to the figures.

FIG. 1 is a block diagram illustrating an entire configuration of an image processing apparatus according to example embodiments.

Referring to FIG. 1, the image processing apparatus for enhancing depth perception may include, for example, a color space converting unit 101, a foreground layer processing unit 102, a background layer processing unit 103, and a middle layer processing unit 104.

The color space converting unit 101 may convert a color space of an input image including layers according to a depth. As an example, the input image may include a foreground layer, a middle layer, and a background layer. Also, the converted color space may not be limited to the example provided, and the color space converting unit 101 may convert the color space of the input image into a variety of color spaces (e.g., CIELAB, LCH, HSV, and the like).

As an example, the color space converting unit 101 may convert the color space into the color spaces as given in Table 1.

TABLE 1

| Color space | Contrast | Chromatic | Hue |
|---|---|---|---|
| CIECAM02 | Lightness (J) | Chroma (c) | Hue (H) |
| LCH | Lightness (L) | Chroma (C) | Hue (H) |
| HSV | Lightness (V) | Chroma (S) | Hue (H) |

As an example, the color space converting unit 101 may convert a pixel value included in the input image into a pixel value including a lightness, a chroma, and a hue according to CIECAM02 color space. CIECAM02 may be the color space most resembling human visual perception. Accordingly, an image processing apparatus 100 according to example embodiments may convert an input image of an RGB color space that is unrelated to a human visual system into an image of the CIECAM02 color space.

As an example, to separately process layers constituting the input image, the image processing apparatus 100 may perform processing differently depending on the type of layer being processed. In particular, with respect to the layers constituting the input image, the image processing apparatus 100 may determine whether each of the layers is a foreground layer, a middle layer, and a background layer. Then, the image processing apparatus 100 may process colour components of each of the layers differently based on the determination with respect to the layers.

The foreground layer processing unit 102 may process a colour component of a foreground layer of the input image. As an example, the foreground layer processing unit 102 may process the colour component of the foreground layer to be distinguished from the background layer, thereby enhancing a 3-dimensional (3D) effect of the image. In this instance, the foreground layer processing unit 102 may increase at least one colour component of a contrast, a chroma, and a brightness of the foreground layer, and may enhance depth perception by additionally using another image processing method as described in greater detail below.

The background layer processing unit 103 may process a colour component of the background layer of the input image. As an example, the background layer processing unit 103 may process the colour component of the background layer to be distinguished from the foreground layer. The foreground layer processing unit 102 and the background layer processing unit 103 may enhance a 3D effect of the image by processing contrast, chroma, lightness and various other colour components of each of the layers, and by additionally using another image processing method as described in greater detail below.

The foreground layer processing unit 102 and the background layer processing unit 103 will be described in greater detail in the description of FIG. 3.

The middle layer processing unit 104 may process a colour component of a middle layer using the processed colour component of the foreground layer and the processed colour component of the background layer. That is, the middle layer processing unit 104 may process the colour component of the middle layer using the foreground layer having a processed colour component and the background layer having a processed colour component. Since the middle layer is located between the foreground layer and the background layer, the middle layer processing unit 104 may consider the colour component of the foreground layer together with the colour component of the background layer.

As an example, the middle layer processing unit 104 may determine a hue range in which a representative hue of the foreground layer and a representative hue of the middle layer belong. The middle layer processing unit 104 may process an adjacent color between the foreground layer and the middle layer based on the hue range. In this instance, the middle layer processing unit 104 may process a chroma and a lightness of the middle layer based on the hue ranges of the foreground layer and the middle layer and the lightness intensity of the background layer. The middle layer processing unit 104 will be described in greater detail in the descriptions of FIG. 4 through FIG. 6.

When the processes with respect to the foreground layer, the background layer, and the middle layer are completed, the image processing apparatus 100 may convert the color space of the processed input image into an original color space through the color space converting unit 101 to generate an output image. As an example, when the color space of the input image is RGB, the RGB color space is converted into a CIECAM02 color space and the input image is processed, and when the image processing is completed the color space is converted again from the CIECAM02 color space to the RGB color space.

Figure 2:
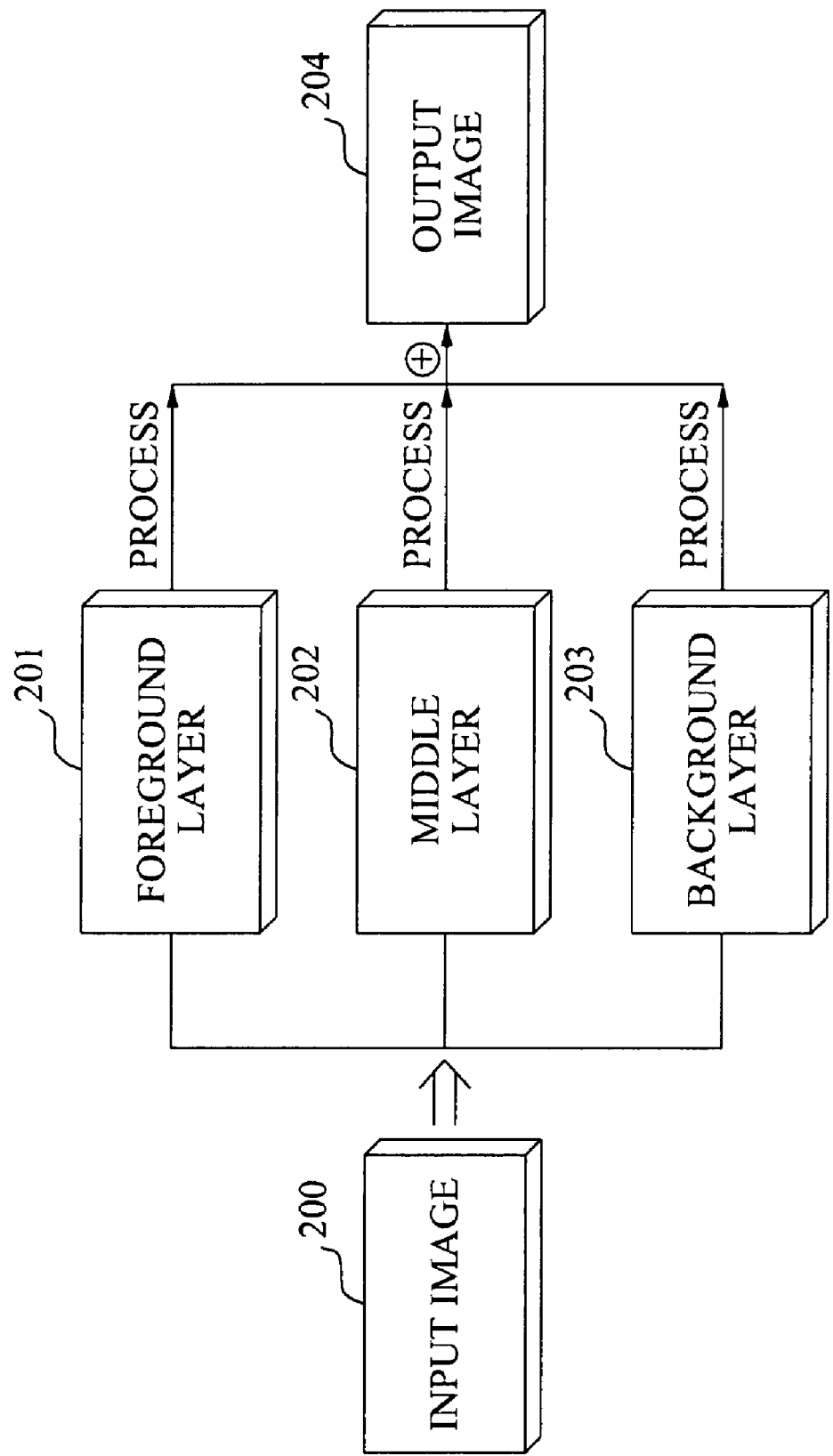
FIG. 2 illustrates a procedure of processing an input image including three layers according to example embodiments.

FIG. 2 illustrates a procedure of processing an input image including three layers according to example embodiments.

Referring to FIG. 2, the input image 200 may include, for example, a foreground layer 201, a middle layer 202, and a background layer 203. Each of the layers may be sequentially arranged according to a depth of the input image.

Accordingly, the input image 200 may be an image including a plurality of layers according to a depth. Although an input image 200 including three layers is illustrated in FIG. 2, the input image 200 may actually include more than three layers. For example, when an input image includes ten layers, the image processing apparatus may classify each of the ten layers into a foreground layer 201, a middle layer 202, and a background layer 203 according to a depth.

That is, the image processing apparatus according to example embodiments may classify the input image into three layers, namely the foreground layer 302, the middle layer 202, and the background layer 203, and process the input image, thereby generating a more natural 3D effect between layers. Also, the image processing apparatus according to example embodiments performs hue processing differently for each foreground layer 201, middle layer 202, and background layer 203, thereby generating an output image 204 from which a depth perception may be perceived by stages.

Figure 3:
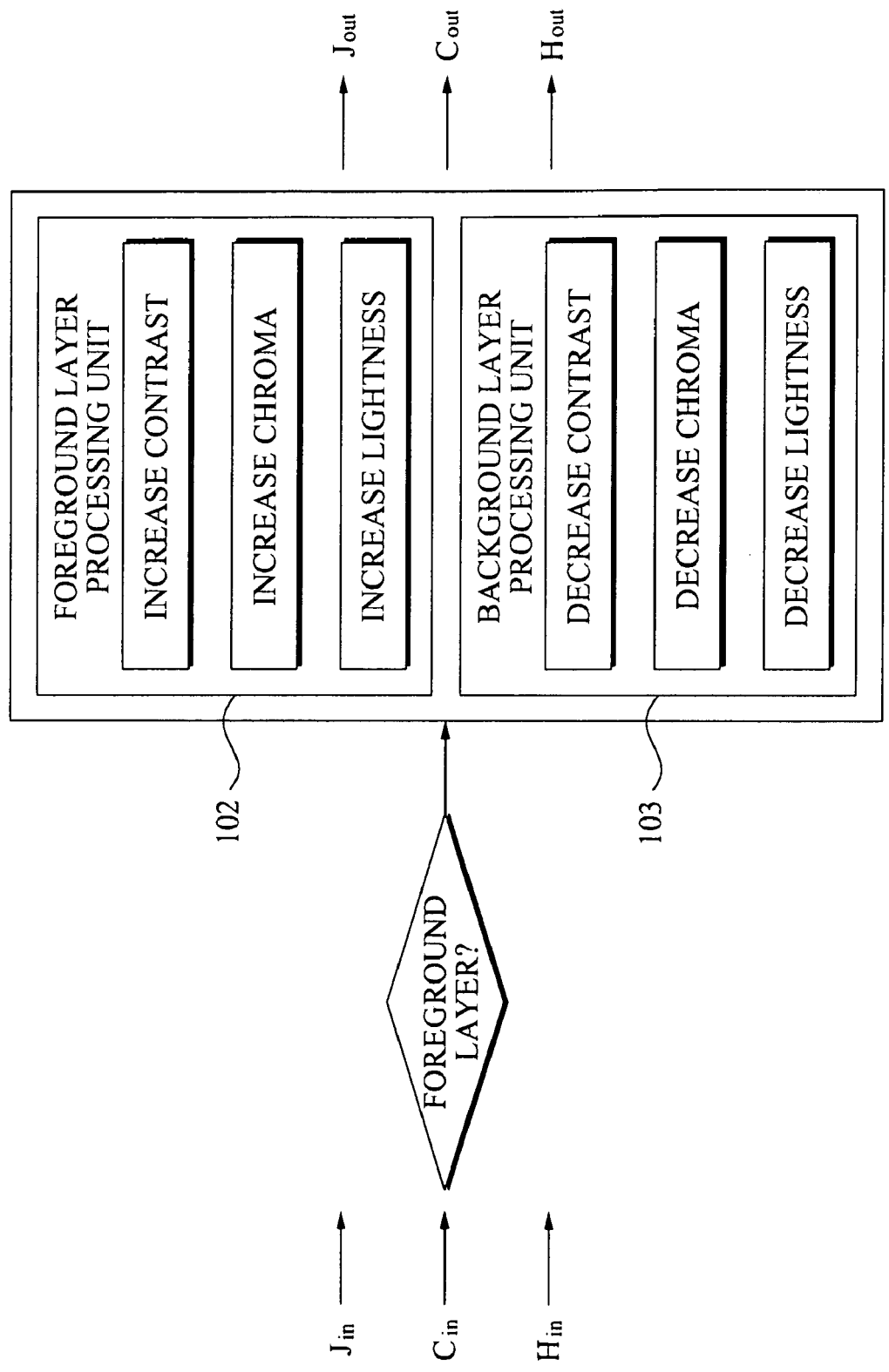
FIG. 3 illustrates a procedure of processing a colour component of a foreground layer and a colour component of a background layer according to example embodiments.

FIG. 3 illustrates a procedure of processing a colour component of a foreground layer and a colour component of a background layer according to example embodiments.

FIG. 3 illustrates that an input image color space, which is converted into CIECAM02, is input. That is, each pixel of the input image, which is converted into CIECAM02, may be represented by colour components of a lightness (J), a chroma (C), and a color (H).

The image processing apparatus according to example embodiments may determine whether a layer to be processed is a middle layer. When the layer is different from the middle layer, the image processing apparatus may determine whether the layer to be processed is the foreground layer, as illustrated in FIG. 3. A foreground layer processing unit 102 may process a colour component of the foreground layer, and a background layer processing unit 103 may process a colour component of the background layer.

As an example, the foreground layer processing unit 102 may increase at least one colour component of a contrast, a chroma, and a lightness of the input image. In this instance, the foreground layer processing unit 102 may increase the contrast, the chroma, or the lightness according to a given Equation 1 as shown below.

Equation 1:

$$J_{out} = K_{B1} J_{in}^2 + K_{B2} J_{in}, \quad K_{B2} = 1 - 100 K_{B1} \quad (a)$$

$$C_{out} = K_S C_{in} \quad (b)$$

$$\begin{cases} J_{out} = K_{CS1} J_{in}^2 + K_{CS2} J_{in}, & J_{in} \leq J_M \\ J_{out} = K_{CL1} J_{in}^2 + K_{CL2} J_{in} + K_{CL3}, & J_{in} > J_M \end{cases} \quad (d)$$

$$K_{CS2} = 1 - K_{CS1} J_M$$

$$K_{CL1} = -K_{CS1}$$

$$K_{CL2} + 1 + \frac{(10000 - J_M^2) K_{CL1}}{J_M - 100}$$

$$K_{CL3} = 100 - 1000 K_{CL1} - 100 K_{CL2}$$

Here, because Equation 1 (a) is for increasing the lightness, $J_{in}$ and $J_{out}$ indicate a lightness of an input and a lightness of an output, respectively, and $K_{B1}$ and $K_{B2}$ indicate scaling parameters. Also, because Equation 1 (b) is for increasing the chroma, $C_{in}$ and $C_{out}$ indicate a chroma of the input and a lightness of the output, respectively, and $K_S$ indicates scaling parameters. Also, because Equation 1 (c) is for increasing the contrast, $J_{in}$ and $J_{out}$ indicate a lightness of the input and a lightness of the output, respectively, and $J_M$ indicates an average lightness of the foreground layer. $K_{CS1}$ and $K_{CS2}$ indicate a scaling parameter with respect to a foreground layer having an average lightness less than $J_M$, and $K_{CL1}$, $K_{CL2}$, and $K_{CL3}$ indicate a scaling parameter with respect to a foreground layer having an average lightness greater than $J_M$. As an example, the background layer processing unit 103 may decrease at least one colour component of the contrast, the chroma, and the lightness of the input image. In this instance, the background layer processing unit 103 may decrease the at least one colour component of the contrast, the chroma, and the lightness of the input image by controlling the scaling parameter of Equation 1.

In FIG. 3, the foreground layer processing unit 102 and the background layer processing unit 103 may process other colour components in addition to the contrast, the chroma, and the lightness, thereby enhancing a depth perception of the input image. In this instance, the foreground layer processing unit 102 and the background layer processing unit 103 may use image processing methods opposite from each other.

Figure 4:
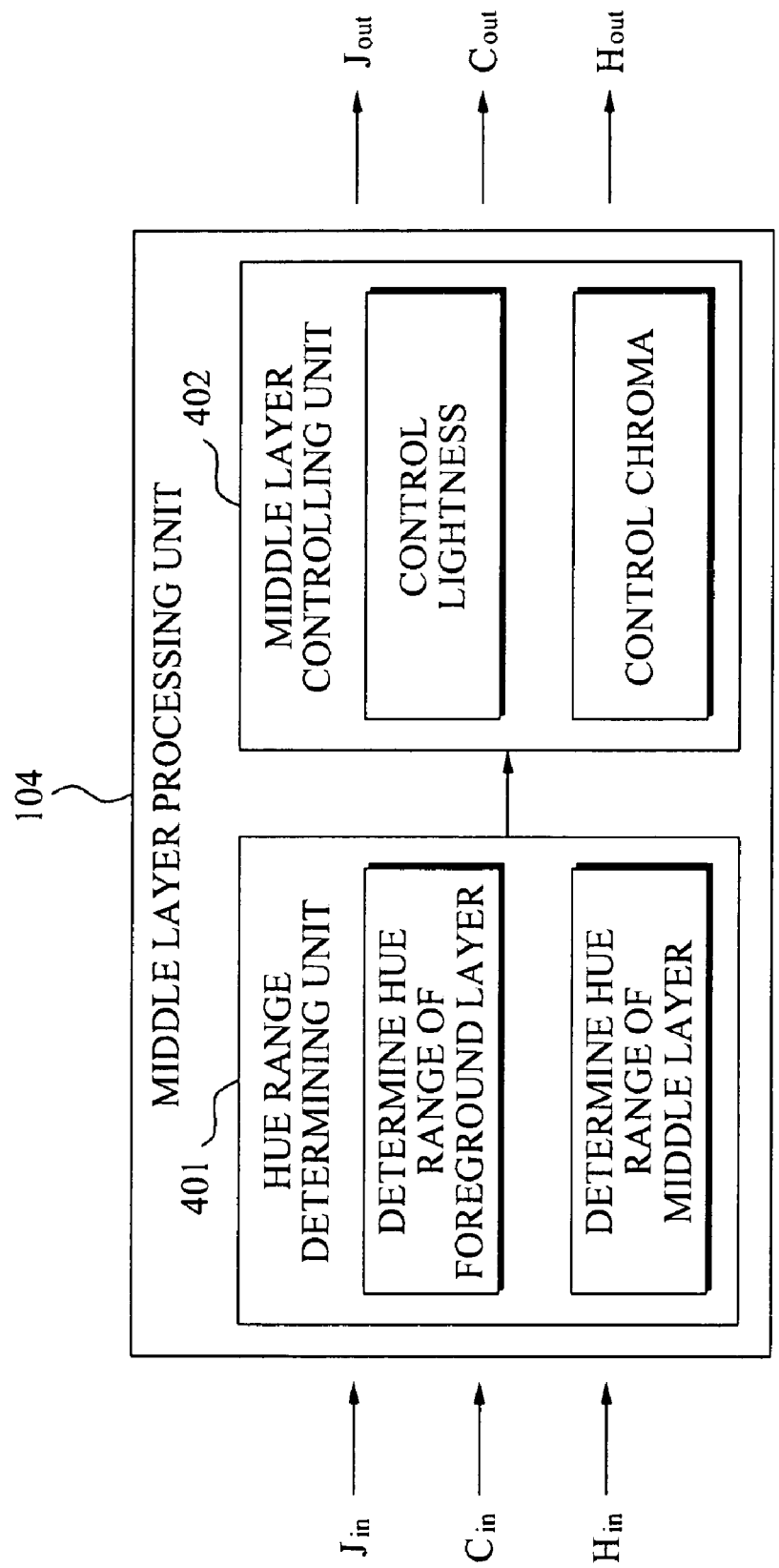
FIG. 4 illustrates a procedure of processing a colour component of a middle layer according to example embodiments.

FIG. 4 illustrates a procedure of processing a colour component of a middle layer according to example embodiments.

Referring to FIG. 4, the middle layer processing unit 104 may include, for example, a hue range determining unit 401 and a middle layer controlling unit 402.

The hue range determining unit 401 may determine a hue range in which a representative hue of a foreground layer and a representative hue of a middle layer belong. As an example, the hue range determining unit 401 may determine the hue range to process an adjacent color between the foreground layer and the middle layer based on a CIECAM02 color table. A process of determining the hue range will be described in greater detail in the description of FIG. 5.

The middle layer controlling unit 402 may control a lightness and a chroma of the middle layer based on a hue range of the foreground layer and a hue range of the middle layer and a lightness intensity of the background layer. In this instance, when the hue range of the foreground layer and the hue range of the middle layer are identical, the middle layer controlling unit 402 may bypass a process of controlling the lightness and chroma of the middle layer. Also, when the hue range of the foreground layer and the hue range of the middle layer are different from each other, the middle layer controlling unit 402 may control the lightness and the chroma of the middle layer according to a predetermined method.

That is, the middle layer controlling unit 402 may control a color stereopsis of the middle layer according to a visual characteristic. Color stereopsis is a phenomenon in which a human perceives an object having a color with a longer wavelength as closer than an object having a color with a shorter wavelength. Color stereopsis is a phenomenon in which the eyes experience confusion, similar to an optical illusion. When you see an object in a single color, an image of the object is formed exactly on the retinas. However, when you simultaneously see two things of different colors having significantly different wavelengths (e.g., a blue object and a red object), the eyes enable images of the two things to be formed on the retinas at the same time, and thus the eyes experience confusion.

Also, since color stereopsis is a visual perception phenomenon that may not occur alone, it may be considered together with the adjacent color. In general, a color with the longer wavelength is perceived as if an object having the color with the longer wavelength is closer than an object having the color with the shorter wavelength. However, this may be reversed as the lightness intensity of the background layer is closer to "white". Accordingly, color stereopsis may be changed based on the lightness intensity of the background layer and the hue range of the foreground layer, and thus a degree of perception for the 3D effect may be changed. The image processing apparatus of example embodiments may process the middle layer based on the lightness of the background layer, and thereby may control a color stereopsis of the input image.

A process of controlling the lightness and the chroma of the middle layer will be described in greater detail in the description of FIG. 6.

Figure 5:
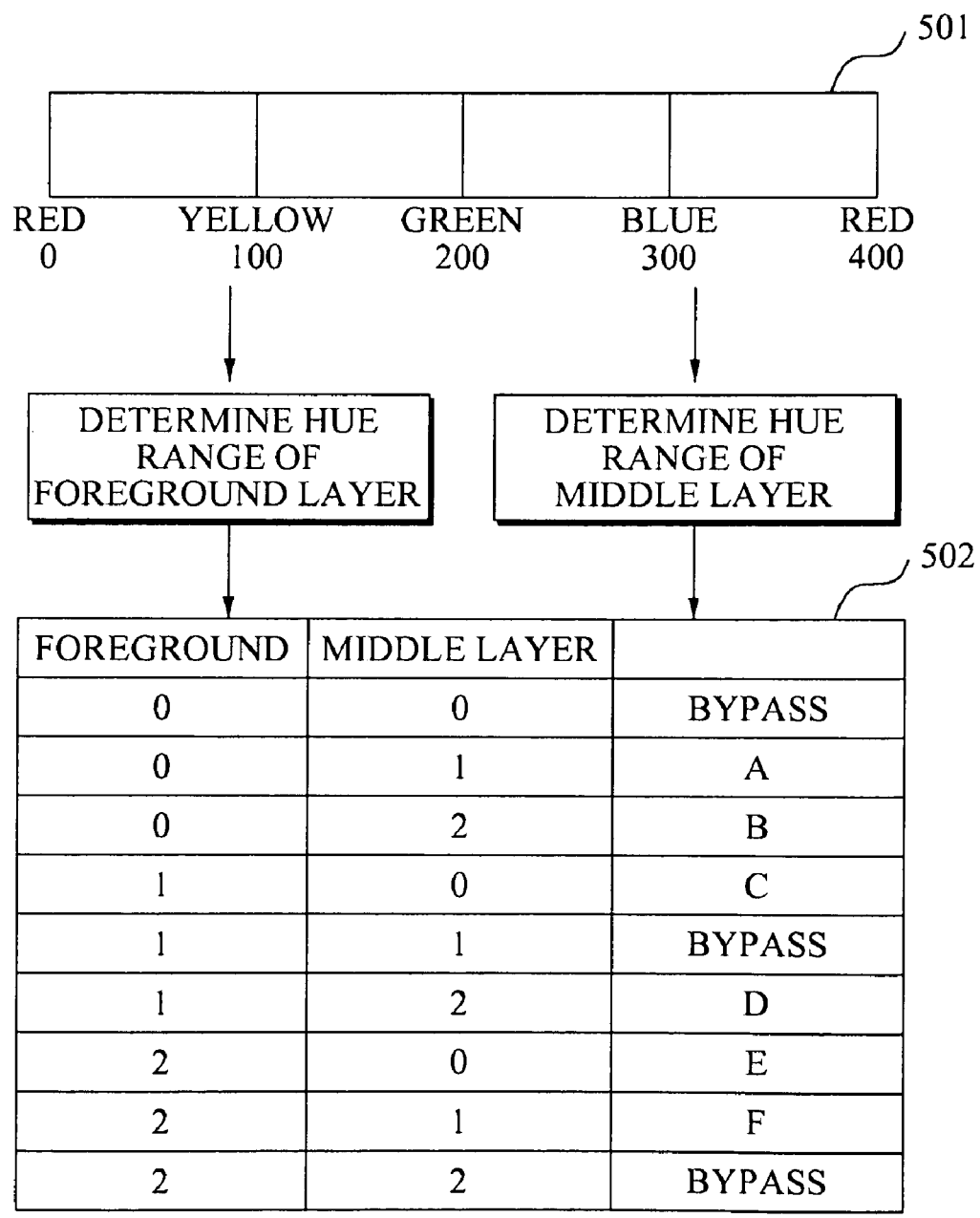
FIG. 5 illustrates a procedure of processing a middle layer according to a hue range of a foreground layer and a hue range of a middle layer according to example embodiments.

FIG. 5 illustrates a procedure of processing a middle layer according to a hue range of a foreground layer and a hue range of a middle layer according to example embodiments.

Referring to FIG. 5, there is a hue range 501 of CIECAM02. As an example, a color range determining unit 401 may determine a hue range in which a representative hue of a foreground layer and a hue of a middle layer belong. In this instance, the hue range determining unit 401 may determine the representative hues of the foreground layer and the middle layer according to Equation 2 given as below.

Equation 2:

$$H_{Rep} = \frac{\sum_{i \in Fore\ or\ Mid} H_i}{N}$$

Here, $H_i$ indicates hues of pixels included in the foreground layer or the middle layer and N indicate a total number of pixels included in the foreground layer or the middle layer. That is, an average hue with respect to each layer is determined as the representative hue. A process of determining the representative hue is not limited to the mentioned example, and various methods may be applied depending on a configuration of a system.

When the representative hue of the foreground layer and the middle layer is determined, the hue range determining unit 401 may determine a hue range of CIECAM02 where each of the representative hues belongs, based on the hue range 501 of CIECAM02. The hue ranges of CIECAM02 may be categorized into a range between red and yellow (0 to 100), a range between yellow and green (100 to 200), a range between green and blue (200 to 300), and a range between blue and red (300 to 400).

The hue range determining unit 401 may determine the hue ranges with the respect to the foreground layer and the middle layer, respectively, to process an adjacent color between the foreground layer and the middle layer.

As an example, as illustrated in FIG. 5, the middle layer controlling unit 402 may select a predetermined method for processing the middle layer according to the hue range of the foreground layer and the hue range of the middle layer. In this instance, "0" indicates that the representative hue is red and yellow having a long wavelength, "1" indicates that the representative hue is green having a medium wavelength, and "2" indicates that the representative hue is blue having a short wavelength.

As illustrated in FIG. 5, when the hue ranges of the foreground layer and the middle layer are identical, the middle layer controlling unit 402 may bypass a process of controlling the middle layer. Also, when the hue ranges of the foreground layer and the middle layer are different from each other, the middle layer controlling unit 402 may control the middle layer according to any one of the predetermined-methods of A, B, C, D, E, and F. The predetermined methods will be described in greater detail in the description of FIG. 6.

FIG. 6 illustrates an example of processing a lightness and a chroma of a middle layer based on a intensity of a lightness of a background layer according to example embodiments.

A table 601 illustrates an example in which a layer controlling unit 402 controls the lightness of the middle layer. Also, a table 602 illustrates an example in which the middle layer controlling unit 402 controls the chroma of the middle layer. Also, items A, B, C, D, E, and F in tables 601 and 602 are predetermined methods for controlling the middle layer according to the hue ranges of the foreground layer and the middle layer, as described in greater detail with reference to FIG. 5.

Referring to tables 601 and 602, the middle layer controlling unit 402 may control the middle layer based on the hue ranges of the foreground layer and the middle layer while also considering a lightness intensity of a background layer. As described above, a color stereopsis may be reversed depending on the lightness of the background layer, and the middle layer controlling unit 402 may control the middle layer based on the lightness intensity of the background layer. In this instance, the middle layer controlling unit 402 may separately process the lightness of the middle layer and the chroma of the middle layer.

As an example, referring to table 601, the middle layer controlling unit 402 may decrease the lightness of the middle layer according to method C when the hue range of the foreground layer is green, the hue range of the middle layer is yellow or red, and the background layer is of medium lightness. Also, referring to table 602, the middle layer controlling unit 402 may increase the chroma of the middle layer according to method C in the same condition. In this instance, a strong lightness indicates that the background lightness is closer to "white", and a weak lightness indicates that the background lightness is closer to "black".

To increase or decrease the lightness and chroma of the middle layer, a variety of methods may be applied. As an example, the middle layer controlling unit 402 may increase or decrease the lightness or the chroma of the middle layer by adding a predetermined gain to or subtracting gain from each of pixels constituting the layer. Also, the middle layer controlling unit 402 may increase or decrease the lightness of the chroma of the middle layer by multiplying each of the pixels constituting the layer by the predetermine gain. The above mentioned method is merely an example, and various other methods for increasing or decreasing the lightness and chroma of the middle layer may be applied depending on a configuration of a system.

Figure 7:
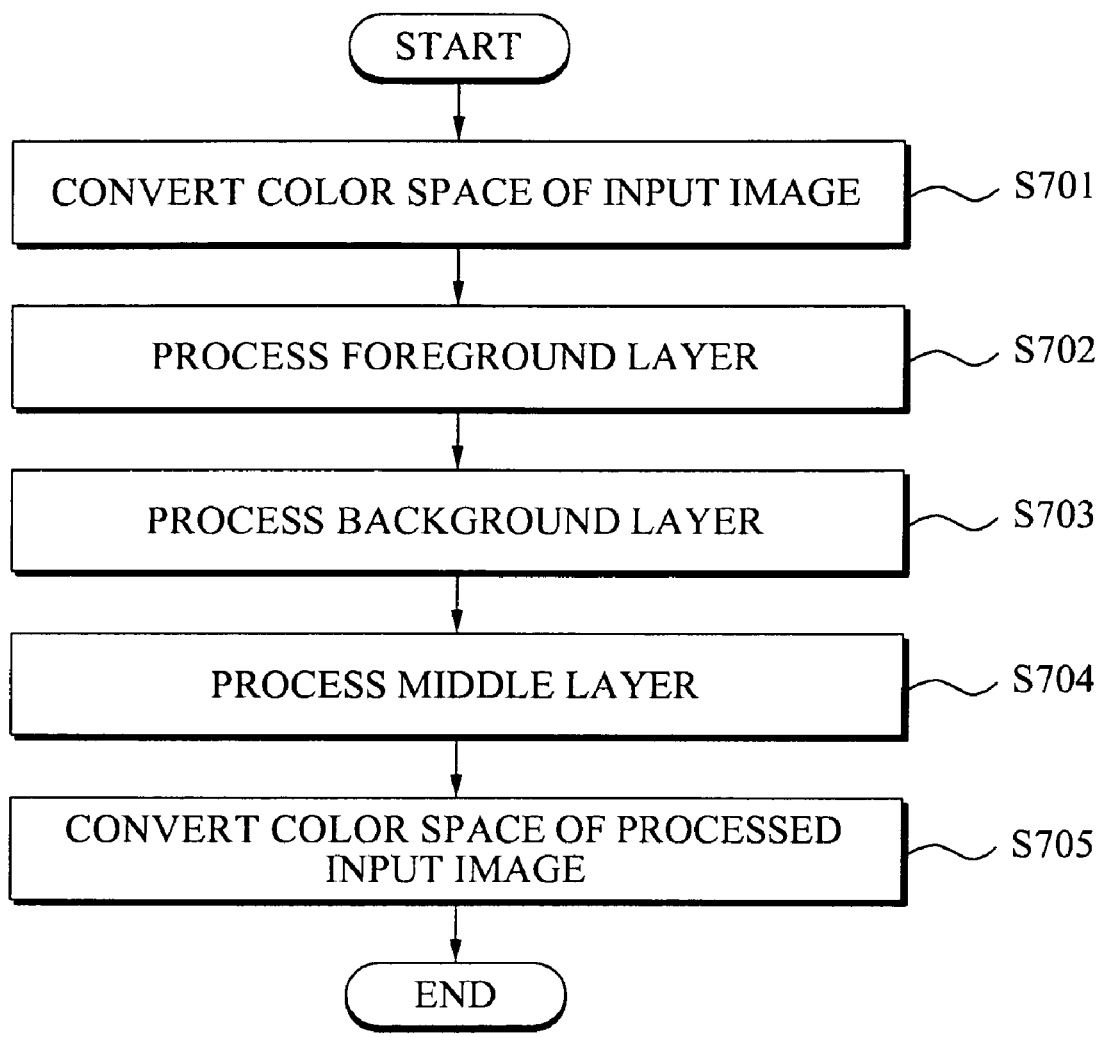
FIG. 7 is a flowchart illustrating an entire procedure of an image processing method according to example embodiments.

FIG. 7 is a flowchart illustrating an entire procedure of an image processing method according to example embodiments.

In operation S701, the image processing apparatus may convert a color space of an input image including layers according to a depth. That is, the image processing apparatus may convert an input image of RGB color space into an image of a variety of color spaces. As an example, the image processing apparatus may convert a pixel value included in the input image into a pixel value including a lightness, a chroma, and a hue according to CIECAM02 color space. Here, the input image may include a foreground layer, a middle layer, and a background layer.

Subsequently, the image processing apparatus may determined whether a layer to be processed is a middle layer, and when the layer is not the middle layer, perform either operation S702 or operation S703 according to a determination of whether the layer is a foreground layer or a background layer. Also, when the layer is the middle layer, the image processing apparatus may perform operation S704.

In operation S702, the image processing apparatus may process a colour component of the foreground layer of the input image. As an example, the image processing apparatus may increase at least one of a contrast, a chroma, and a lightness of the foreground layer.

In operation S703, the image processing apparatus may process a colour component of the background layer of the input image. As an example, the image processing apparatus may decrease at least one of the contrast, the chroma, and the lightness of the foreground layer.

In operation S704, the image processing apparatus may process a colour component of the middle layer. As an example, the image processing apparatus may determine a hue range where a representative hue of the foreground layer and a representative hue of the middle layer belong. In this instance, the image processing apparatus may determine the hue range based on a color table of CIECAM02 to process an adjacent color between the foreground layer and the middle layer.

Here, the image processing apparatus may control a color stereopsis of the middle layer based on a lightness intensity of the background layer. In this instance, the image processing apparatus may control the lightness and chroma of the middle layer based on the hue range of the foreground layer and the hue range of the middle layer together while considering the lightness intensity of the background layer.

Accordingly, the image processing apparatus according to example embodiments may separately process layers with respect to an input image including layers according to a depth, thereby enhancing a depth perception of the input image.

In operation S705, the image processing apparatus may convert a color space of the processed input image into an original color space. As an example, when an existing color space of the input image is RGB and a converted color space is CIECAM02, the image processing apparatus may convert the color space of the input image processed with respect to each of the layers into an RGB color space again.

Omitted description in descriptions of FIG. 7 may be appreciated from the descriptions with reference to FIGS. 1 through 6.

The image processing method for enhancing a depth perception according to the above-described example embodiments may be recorded as computer readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

According to example embodiments, there may be provided an image processing apparatus and method of enhancing a 3D effect by stages by differently performing image processing for each layer with respect to an input image including at least two layers according to a depth.

According to example embodiments, there may be provided an image processing apparatus and method of enhancing a 3D effect so as to be more natural by performing image processing with respect to a middle layer in addition to a foreground layer and background layer.

According to example embodiments, there may be provided an image processing apparatus and method for processing an adjacent color between a foreground layer and a middle layer by controlling a colour component of the middle layer based on a hue range of the foreground layer and a hue range of the middle layer.

According to example embodiments, there may be provided an image processing apparatus and method of providing a 3D effect improvement based on a color stereopsis according to a background layer by controlling a colour component of a middle layer based on a lightness intensity of the background layer.

What is claimed is:

1. An image processing apparatus, the apparatus comprising:
    a color space converting unit to convert a color space of an input image including layers according to a depth;
    a foreground layer processing unit to process a colour component of a foreground layer of the input image having the color space converted by the color space converting unit;
    a background layer processing unit to process a colour component of a background layer of the input image having the color space converted by the color space converting unit;
    a middle layer processing unit to process a colour component of a middle layer of the input image using the processed colour component of the foreground layer and the processed colour component of the background layer.

2. The apparatus of claim 1, wherein the color space converting unit converts a pixel value included in the input image into a pixel value including a lightness, a chroma, and a hue based on a CIECAM02 color space.

3. The apparatus of claim 1, wherein the foreground layer processing unit increases at least one colour component of a contrast, a chroma, and a lightness of the foreground layer.

4. The apparatus of claim 1, wherein the background layer processing unit decreases at least one colour component of a contrast, a chroma, and a lightness of the background layer.

5. The apparatus of claim 1, wherein the middle layer processing unit comprises:
    a hue range determining unit to determine a hue range in which a representative hue of the foreground layer and a representative hue of a middle layer belong; and
    a middle layer controlling unit to control a color stereopsis of the middle layer according to a lightness intensity of the background layer.

6. The apparatus of claim 5, wherein the hue range determining unit determines the hue range to process an adjacent color between the foreground layer and the middle layer based on a color table of CIECAM02.

7. The apparatus of claim 5, wherein the middle layer controlling unit controls a lightness and a chroma of the middle layer based on the hue ranges of the foreground layer and the middle layer and the lightness intensity of the background layer.

8. The apparatus of claim 7, wherein the middle layer controlling unit, when the hue range of the foreground layer and the hue range of the middle layer are the same, bypasses a process of the controlling the lightness and the chroma of the middle layer, and when the hue range of the foreground layer and the hue range of the middle layer are different, controls the lightness and the chroma of the middle layer based on the lightness intensity of the background layer.

9. An image processing method, the method comprising:
    converting a color space of an input image including layers according to a depth;
    processing a colour component of a foreground layer of the input image having the converted color space;
    processing a colour component of a background layer of the input image having the converted color space; and
    processing a colour component of a middle layer of the input image using the processed colour component of the foreground layer and the processed colour component of the background layer.

10. The method of claim 9, wherein the converting of the color space converts a pixel value included in the input image into a pixel value including a lightness, chroma, and a hue based on a CIECAM02 color space.

11. The method of claim 9, wherein the processing of the colour component of the foreground increases at least one colour component of a contrast, a chroma, and a lightness of the foreground layer.

12. The method of claim 9, wherein the processing of the colour component of the background decreases at least one colour component of a contrast, a chroma, and a lightness of the background layer.

13. The method of claim 9, wherein the processing of the colour component of the middle layer comprises:
    determining a hue range in which a representative hue of the foreground layer and a representative hue of a middle layer belong; and controlling a color stereopsis of the middle layer according to a lightness intensity of the background layer.

14. The method of claim 13, wherein the determining of the hue range determines the hue range to process an adjacent color between the foreground layer and the middle layer based on a color table of CIECAM02.

15. The method of claim 13, wherein the controlling of the color stereopsis controls a lightness and a chroma of the middle layer based on the hue ranges of the foreground layer and the middle layer and the lightness intensity of the background layer.

16. The method of claim 15, wherein the controlling of the color stereopsis, when the hue range of the foreground layer and the hue range of the middle layer are the same, bypasses a process of controlling the lightness and the chroma of the middle layer, and when the hue range of the foreground layer and the hue range of the middle layer are different, controls the lightness and the chroma of the middle layer based on the lightness intensity of the background layer.

17. A non-transitory computer readable recording media storing computer readable code comprising a program implementing the method of claim 9.

* * * * *